(12) United States Patent
Takeichi et al.

(10) Patent No.: US 10,782,180 B2
(45) Date of Patent: Sep. 22, 2020

(54) HOPPER AND COMBINATION WEIGHING DEVICE

(71) Applicant: Ishida Co., Ltd., Kyoto (JP)

(72) Inventors: Shinji Takeichi, Ritto (JP); Hideshi Miyamoto, Ritto (JP); Toshiharu Kageyama, Ritto (JP); Mikio Kishikawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 16/334,521

(22) PCT Filed: Sep. 14, 2017

(86) PCT No.: PCT/JP2017/033334
§ 371 (c)(1),
(2) Date: Mar. 19, 2019

(87) PCT Pub. No.: WO2018/056182
PCT Pub. Date: Mar. 29, 2018

(65) Prior Publication Data
US 2020/0200587 A1    Jun. 25, 2020

(30) Foreign Application Priority Data

Sep. 20, 2016 (JP) ................................. 2016-183351

(51) Int. Cl.
*G01G 19/387* (2006.01)
*B65G 65/30* (2006.01)
*G01G 13/18* (2006.01)

(52) U.S. Cl.
CPC ........... *G01G 19/387* (2013.01); *B65G 65/30* (2013.01); *G01G 13/18* (2013.01)

(58) Field of Classification Search
CPC ...... G01G 13/16; G01G 13/18; G01G 19/387; G01G 19/393; B65G 65/30
See application file for complete search history.

(56) References Cited

U.S. PATENT DOCUMENTS 5,379,923 A * 1/1995 Sagastegui ............. G01G 13/18
177/108
5,736,683 A 4/1998 Howard
(Continued)

FOREIGN PATENT DOCUMENTS

CN        1828238 A    9/2006
CN     201190000 Y    2/2009
(Continued)

OTHER PUBLICATIONS

International Search Report issued in PCT/JP2017/03334; dated Nov. 28, 2017.
(Continued)

*Primary Examiner* — Randy W Gibson
(74) *Attorney, Agent, or Firm* — Studebaker & Brackett PC (57) ABSTRACT

A hopper includes a main body having a first opening to which articles are thrown in and a second opening from which the articles are discharged, a gate capable of being opened and closed with respect to the second opening, a restricting portion configured to restrict an opening and closing operation of the gate with respect to the second opening, and an attaching portion capable of being attached and detached with respect to an attached portion provided on a weighing apparatus. The restricting portion starts restricting the opening and closing operation in a state where the gate is closed with respect to the second opening in conjunction with an operation of detaching the attaching portion from the attached portion.

10 Claims, 6 Drawing Sheets

(56) References Cited

U.S. PATENT DOCUMENTS

| | | | | |
|---|---|---|---|---|
| 6,271,486 | B1 * | 8/2001 | Franklin | B65D 90/585 |
| | | | | 177/105 |
| 6,698,624 | B2 * | 3/2004 | Ufheil | A47J 31/404 |
| | | | | 222/153.14 |
| 6,774,318 | B2 * | 8/2004 | Beal | B01F 3/18 |
| | | | | 177/105 |
| 7,053,317 | B2 * | 5/2006 | Asai | G01G 13/16 |
| | | | | 177/103 |
| 10,018,496 | B2 * | 7/2018 | Morimoto | B65G 11/023 |
| 2002/0145013 | A1 * | 10/2002 | Chrisman | A47J 31/404 |
| | | | | 222/325 |

FOREIGN PATENT DOCUMENTS

| | | |
|---|---|---|
| JP | H09264776 A | 10/1997 |
| JP | 2003-014530 A | 1/2003 |
| JP | 2004109079 A | 4/2004 |
| JP | 2008-185541 A | 8/2008 |
| JP | 2012237643 A | 12/2012 |
| JP | 2016132568 A | 7/2016 |

OTHER PUBLICATIONS

Written Opinion issued in PCT/JP2017/03334; dated Nov. 28, 2017.
International Preliminary Report on Patentability issued in PCT/JP2017/033334; dated Apr. 4, 2019.

* cited by examiner

HOPPER AND COMBINATION WEIGHING DEVICE

TECHNICAL FIELD

The present disclosure relates to a hopper and a combination weighing apparatus.

BACKGROUND ART

Patent Literature 1 discloses a combination weighing apparatus provided with a plurality of hoppers that temporarily stores articles. The hopper disclosed in Patent Literature 1 includes a main body having a first opening to which the articles are thrown in and a second opening from which the articles are discharged, a gate that can be opened and closed with respect to the second opening, and a mechanism for manually locking an opening and closing operation of the gate.

CITATION LIST

Patent Literature

Patent Literature 1: Japanese Unexamined Patent Publication No. 2016-132568

SUMMARY OF INVENTION

Technical Problem

It is desired to further improve the ease of attaching and detaching the hopper, because the above-described hopper may be frequently attached and detached with respect to the weighing apparatus for cleaning and the like, for example.

An object of the present disclosure is to provide a hopper that can be easily attached and detached with respect to the weighing apparatus and a combination weighing apparatus on which the hopper can be easily attached and detached.

Solution to Problem

A hopper according to one aspect of the present disclosure is a hopper to be attached to a weighing apparatus and includes a main body having a first opening to which articles are thrown in and a second opening from which the articles are discharged, a gate capable of being opened and closed with respect to the second opening, a restricting portion configured to restrict an opening and closing operation of the gate with respect to the second opening, and an attaching portion capable of being attached and detached with respect to an attached portion provided on the weighing apparatus, in which the restricting portion starts restricting the opening and closing operation in a state where the gate is closed with respect to the second opening in conjunction with an operation of detaching the attaching portion from the attached portion.

In the hopper according to one aspect of the present disclosure, the restricting portion starts restricting the opening and closing operation in a state where the gate is closed with respect to the second opening in conjunction with the operation of detaching the attaching portion from the attached portion. Thus, even if the hopper is detached from the weighing apparatus with one hand for example, the gate is automatically locked in a closed state in conjunction with such a detaching operation. As a result, it is possible to improve the ease of attaching and detaching the hopper.

A hopper according to another aspect of the present disclosure is a hopper to be attached to a weighing apparatus and includes a main body having a first opening to which articles are thrown in and a second opening from which the articles are discharged, a gate capable of being opened and closed with respect to the second opening, a restricting portion configured to restrict an opening and closing operation of the gate with respect to the second opening, and an attaching portion capable of being attached and detached with respect to an attached portion provided on the weighing apparatus, in which the restricting portion releases restriction of the opening and closing operation in conjunction with an operation of attaching the attaching portion to the attached portion.

In the hopper according to the other aspect, the restricting portion releases the restriction of the opening and closing operation in conjunction with the operation of attaching the attaching portion to the attached portion. Thus, even if the hopper is attached to the weighing apparatus with one hand for example, the lock of the gate is automatically released in conjunction with such an attaching operation and the gate is in a state of being able to be opened and closed. As a result, it is possible to improve the ease of attaching and detaching the hopper.

In the hopper according to one aspect of the present disclosure, the restricting portion may start restricting the opening and closing operation in a state where the gate is closed with respect to the second opening, as a contact between the restricting portion and the attached portion is released when the attaching portion is detached from the attached portion. In this case, the restricting portion is able to start, restricting the opening and closing operation by utilizing physical contact between the restricting portion and the attached portion.

In the hopper according to the other aspect of the present disclosure, the restricting portion may release the restriction of the opening and closing operation, as a contact between the restricting portion and the attached portion is started when the attaching portion is attached to the attached portion. In this case, the restricting portion is able to release the restriction of the opening and closing operation by utilizing the physical contact between the restricting portion and the attached portion.

In the hopper according to one aspect of and the other aspect of the present disclosure, the restricting portion may have an engaging member capable of engaging with the gate by turning, and a contact member capable of integrally turning with the engaging member, when the attaching portion is detached from the attached portion, a contact between the contact member and the attached portion may be released and a engagement between the engaging member and the gate may be started in a state where the gate is closed with respect to the second opening, and when the attaching portion is attached to the attached portion, the contact between the contact member and the attached portion may be started and the engagement between the engaging member and the gate may be released. In this case, because the contact member can be integrally turned with the engaging member, the engaging member is turned with the contact member as the attached portion comes in contact with the contact member. Thus, the engaging member enables the gate to be opened and closed with respect to the second opening.

In the hopper according to one aspect of and the other aspect of the present disclosure, the engaging member may turn toward one side by own weight of the engaging member and the engagement between the engaging member and the gate may be started in a state where the gate is closed with respect to the second opening, as the contact between the contact member and the attached portion is released when the attaching portion is detached from the attached portion, and the engaging member may be turned toward the other side against the own weight and the engagement between the engaging member and the gate may be released, as the contact between the contact member and the attached portion is started when the attaching portion is attached to the attached portion. In this case, by utilizing the own weight of the engaging member, the engagement between the engaging member and the gate can be started without utilizing a biasing member, for example.

A combination weighing apparatus according to one aspect of the present disclosure includes a conveying unit configured to convey articles, a plurality of hoppers configured to temporarily store the articles conveyed by the conveying unit, a weighing unit configured to weigh a measured value corresponding to a mass of the articles stored in the hopper, a controller configured to select a combination of the measured values from a plurality of the measured values that are weighed by the weighing unit and associated with the respective hoppers such that a total value results in a target measured value and to cause the hoppers that are associated with the relevant combination to discharge the articles, and attached portions to which the hoppers are attached respectively, in which each of the hoppers includes a main body having a first opening to which the articles are thrown in and a second opening from which the articles are discharged, a gate capable of being opened and closed with respect to the second opening, a restricting portion configured to restrict an opening and closing operation of the gate with respect to the second opening, and an attaching portion capable of being attached and detached with respect to an attached portion, and the restricting portion starts restricting the opening and closing operation in a state where the gate is closed with respect to the second opening in conjunction with an operation of detaching the attaching portion from the attached portion.

In the combination weighing apparatus according to one aspect of the present disclosure, the restricting portion starts restricting the opening and closing operation in a state where the gate is closed with respect to the second opening, in conjunction with the operation of detaching the attaching portion from the attached portion. Thus, even if the hopper is detached from the weighing apparatus with one hand for example, the gate is automatically locked in a closed state in conjunction with such a detaching operation. As a result, it is possible to improve the ease of attaching and detaching the hopper.

A combination weighing apparatus according to one aspect of the present disclosure includes a conveying unit configured to convey articles, a plurality of hoppers configured to temporarily store the articles conveyed by the conveying unit, a weighing unit configured to weigh a measured value corresponding to a mass of the articles stored in the hopper, a controller configured to select a combination of the measured values from a plurality of the measured values that are weighed by the weighing unit and associated with the respective hoppers such that a total value results in a target measured value and to cause the hoppers that are associated with the relevant combination to discharge the articles, and attached portions to which the hoppers are attached respectively, in which each of the hoppers includes a main body having a first opening to which the articles are thrown in and a second opening from which the articles are discharged, a gate capable of being opened and closed with respect to the second opening, a restricting portion configured to restrict an opening and closing operation of the gate with respect to the second opening, and an attaching portion capable of being attached and detached with respect to an attached portion, and the restricting portion releases restriction of the opening and closing operation in conjunction with an operation of attaching the attaching portion to the attached portion.

In the combination weighing apparatus according to one aspect of the present disclosure, the restricting portion releases the restriction of the opening and closing operation into a state where the gate is able to be opened and closed with respect to the second opening in conjunction with the operation of attaching the attaching portion to the attached portion. Thus, even if the hopper is attached to the weighing apparatus with one hand for example, the lock of the gate is automatically released in conjunction with such an attaching operation and the gate is in a state of being able to be opened and closed. As a result, it is possible to improve the ease of attaching and detaching the hopper.

Effects of Invention

According to some aspects of the present disclosure, it is possible to provide a hopper that can be easily attached and detached with respect to a weighing apparatus and a combination weighing apparatus on which the hopper can be easily attached and detached.

DESCRIPTION OF EMBODIMENT

The following describes an exemplary embodiment of the present disclosure in detail with reference to the accompanying drawings. In each of the drawings, identical or equivalent portions are denoted by identical reference signs, and redundant explanations are omitted.

Overall Configuration of Combination Weighing Apparatus

Figure 1:
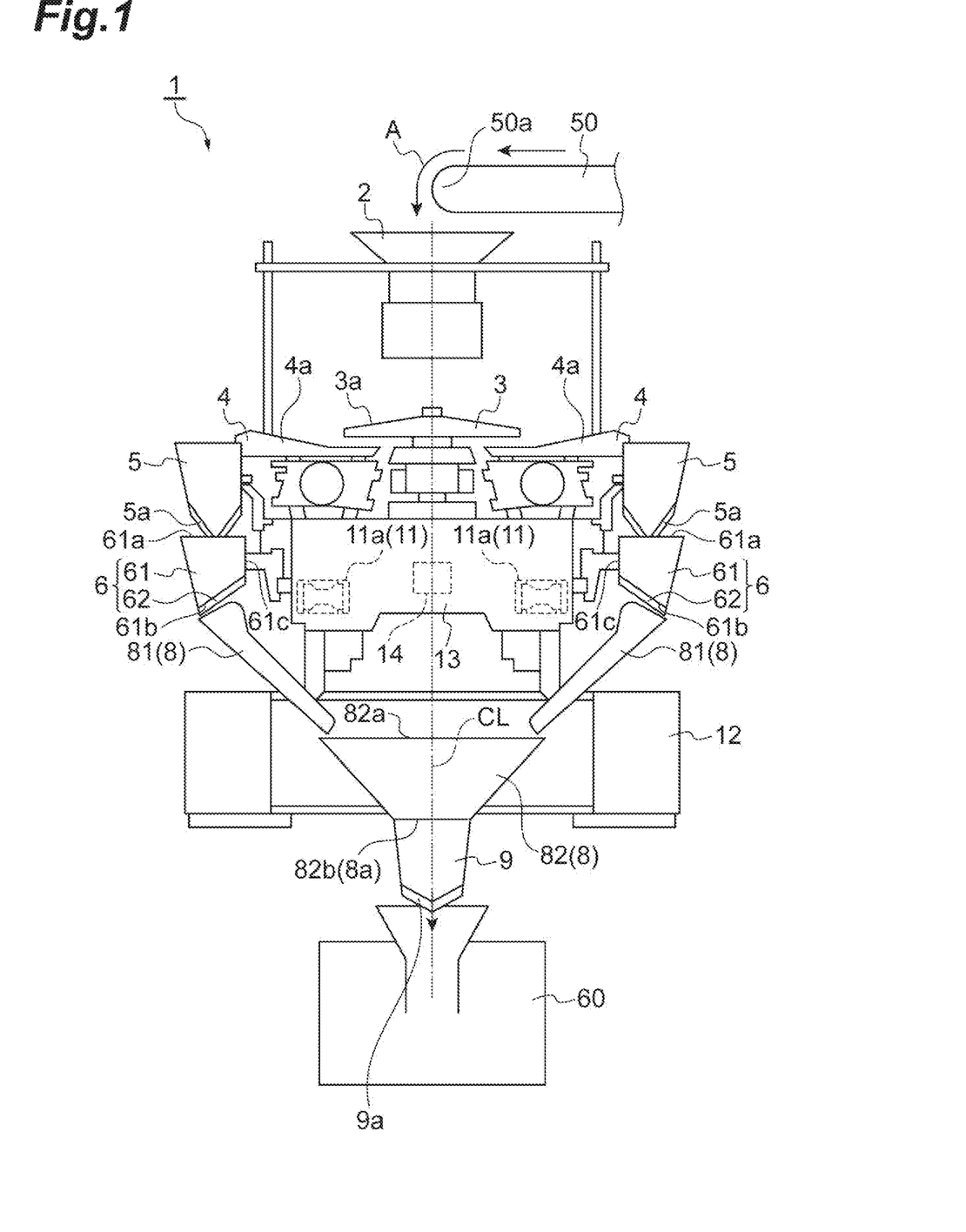
FIG. 1 is a configuration diagram of a combination weighing apparatus according to one embodiment of the present disclosure.

As illustrated in FIG. 1, a combination weighing apparatus (weighing apparatus) 1 is provided with an input chute (conveying unit) 2, a distributing feeder (conveying unit) 3, a plurality of radial feeders (conveying units) 4, a plurality of pool hoppers 5, a plurality of weighing hoppers (hoppers) 6, a collecting chute 8, a timing hopper 9, a weighing unit 11, and a controller 14. The combination weighing apparatus 1 weighs articles A (articles having variations in single body mass such as agricultural products, fishery products, and processed food) supplied by a conveyor 50 so that the articles A result in a target measured value and supplies the articles A to a bag-making and packaging machine 60. The bag-making and packaging machine 60 packages the articles A weighed and supplied by the combination weighing apparatus 1 while forming a film into a bag of a predetermined capacity.

The input chute 2 is arranged below a conveying end 50a of the conveyor 50. The input chute 2 receives the articles A conveyed from the outside by the conveyor 50 and fallen from the conveying end 50a of the conveyor 50, and discharges the articles A downward.

The distributing feeder 3 is arranged below the input chute 2. The distributing feeder 3 has a conveying surface 3a of a conical shape expanding downward. The distributing feeder 3 vibrates the conveying surface 3a, thereby uniformly conveying the articles A discharged on an apex portion of the conveying surface 3a from the input chute 2 toward the outer edge of the conveying surface 3a.

The radial feeders 4 are radially arranged along the outer edge of the conveying surface 3a of the distributing feeder 3. Each radial feeder 4 has a trough 4a extending toward the outside from below the outer edge of the conveying surface 3a. Each radial feeder 4 vibrates the trough 4a, thereby conveying the articles A discharged from the outer edge of the conveying surface 3a toward a distal end portion of the trough 4a.

The pool hoppers 5 are arranged so as to surround a center line CL that is parallel to the vertical direction, for example. Each pool hopper 5 is arranged below the distal end portion of the trough 4a of the respective radial feeders 4. Each pool hopper 5 has a gate 5a that can be opened and closed with respect to the bottom portion of the respective pool hoppers 5. Each pool hopper 5, by closing the gate 5a, temporarily stores therein the articles A discharged from the distal end portion of the trough 4a corresponding thereto. Furthermore, each pool hopper 5, by opening the gate 5a, discharges downward the articles A that have been temporarily stored.

The weighing hoppers 6 are arranged so as to surround the center line CL, for example. Each weighing hopper 6 is arranged below the gate 5a of the respective pool hoppers 5. Each weighing hopper 6 has a main body 61 and a gate 62. On the main body 61, a first opening 61a to which the articles A are thrown in and a second opening 61b from which the articles A are discharged are formed. The gate 62 can be opened and closed with respect to the second opening 61b of the main body 61. Each weighing hopper 6, by closing the gate 62, temporarily stores in the main body 61 the articles A discharged from the pool hopper 5 corresponding thereto. Furthermore, each weighing hopper 6, by opening the gate 62, discharges downward the articles A that have been temporarily stored in the main body 61.

The collecting chute 8 collects the articles A discharged from each of the weighing hoppers 6 at a discharge port 8a. The discharge port 8a is located on a lower side with respect to the weighing hoppers 6 and also on the center line CL. The collecting chute 8 has upper chute portions 81 and a lower chute portion 82. The upper chute portions 81 receive the articles A discharged from the weighing hoppers 6 and slide the relevant articles A toward the discharge port 8a side. The lower chute portion 82 is a tubular body of a truncated conical shape tapered downward and has an upper opening 82a and a lower opening 82b. With the lower opening 82b as the discharge port 8a, the lower chute portion 82 discharges the articles A downward from the discharge port 8a.

The timing hopper 9 is arranged below the discharge port 8a. The timing hopper 9 has a gate 9a that can be opened and closed with respect to the bottom portion of the timing hopper 9. The timing hopper 9, by closing the gate 9a, temporarily stores therein the articles A discharged from the collecting chute 8. Moreover, the timing hopper 9, by opening the gate 9a, discharges the articles A that have been temporarily stored to the bag-making and packaging machine 60.

The weighing unit 11 is arranged inside a case 13 that is supported by a frame 12. The weighing unit 11 has a plurality of load cells 11a. Each load cell 11a supports the weighing hopper 6 corresponding thereto. The weighing unit 11, when the articles A are temporarily stored in each weighing hopper 6, weighs a measured value corresponding to the mass of the relevant articles A.

The controller 14 is arranged inside the case 13. The controller 14 has a central processing unit (CPU), a read only memory (ROM), a random-access memory (RAM), and the like. The controller 14 is a circuit configured to execute the processing of controlling the operation of various units of the combination weighing apparatus 1 such as the conveying operation of the distributing feeder 3 and the radial feeders 4, the opening and closing operation of the gate 5a of each pool hopper 5, the opening and closing operation of the gate 62 of each weighing hopper 6, and the opening and closing operation of the gate 9a of the timing hopper 9. The controller 14 is communicably connected to the bag-making and packaging machine 60.

The controller 14 stores therein the measured value weighed by the weighing unit 11 in association with the weighing hopper 6 in which the articles A corresponding to the relevant measured value are stored. The controller 14 selects a combination of the measured values from a plurality of measured values that were weighed by the weighing unit 11 and associated with the respective weighing hoppers 6 so that a total value results in a target measured value. More specifically, the controller 14 selects the combination of the measured values from the measured values output by the weighing unit 11 so that the total value falls within a predetermined range for which the target measured value is a lower limit value. Then, the controller 14 causes the weighing hoppers 6 corresponding to the relevant combination to discharge the articles A.

The input chute 2, the distributing feeder 3, the radial feeders 4, the pool hoppers 5, and the weighing hoppers 6 are directly or indirectly supported by the case 13. The collecting chute 8 and the timing hopper 9 are directly or indirectly supported on the frame 12.

Configuration on Weighing Hopper

The following describes the configuration concerning the weighing hopper 6 with reference to FIG. 2 to FIG. 6. In the following description, for convenience sake, concerning the weighing hopper 6 in a state of being attached to the combination weighing apparatus 1, the horizontal direction in which the center line CL (see FIG. 1) and the relevant weighing hopper 6 face is defined as an X axis direction, the horizontal direction perpendicular to the X axis direction is defined as a Y axis direction, and the vertical direction is defined as a Z axis direction. Furthermore, for the sake of convenience, concerning the weighing hopper 6 in a state of being attached to the combination weighing apparatus 1, terms such as "up", "down", "in", and "out" are used.

Configuration of Weighing Hopper

Figure 2:
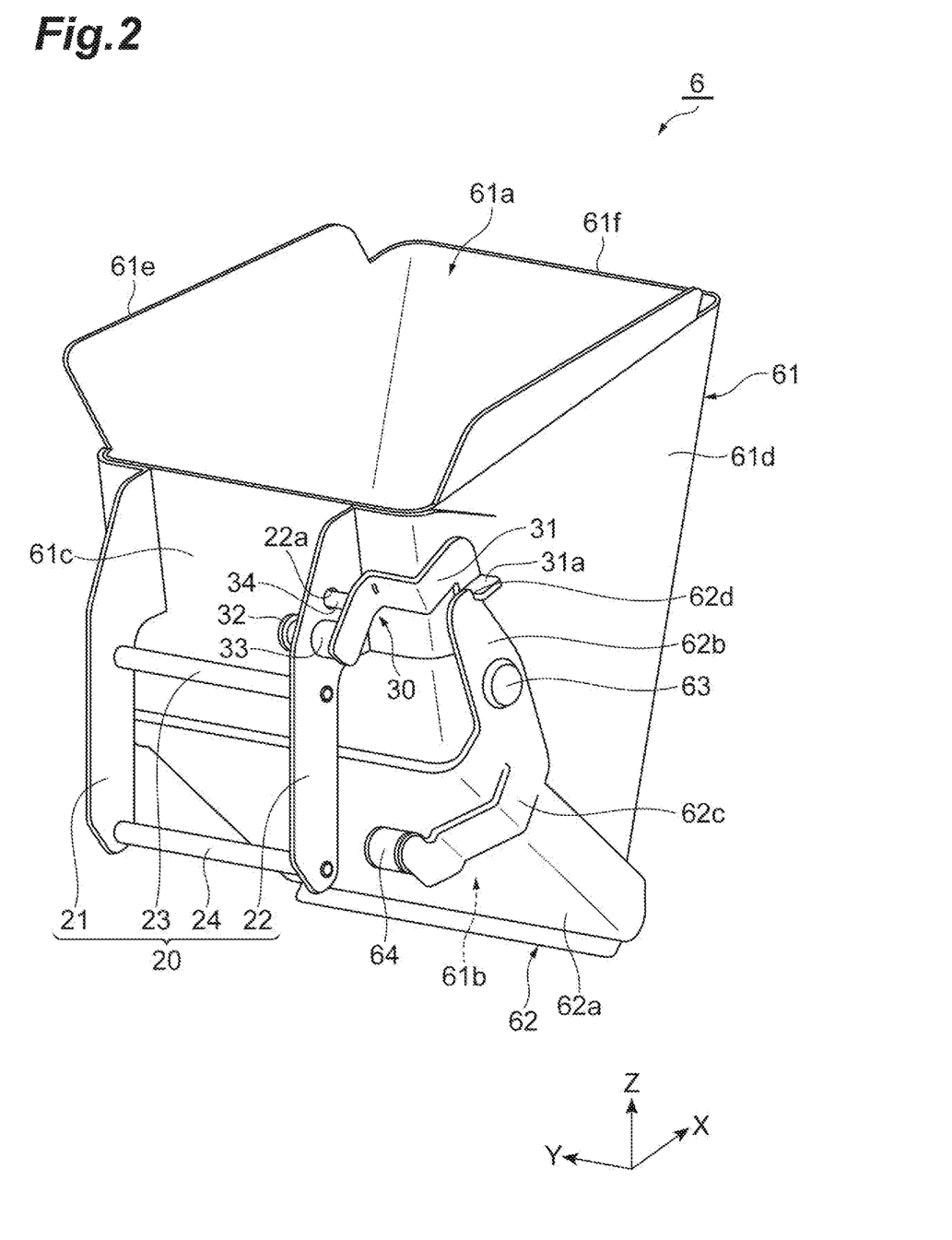
FIG. 2 is a perspective view of a weighing hopper of the combination weighing apparatus in FIG. 1.

As in the foregoing, the weighing hopper 6 has the main body 61 and the gate 62. On the main body 61, the first opening 61a and the second opening 61b are formed. As illustrated in FIG. 2, the main body 61 is a tubular body having side walls 61c, 61d, 61e, and 61f. The side wall 61c is a wall on the center line CL side in the X axis direction (hereinafter simply referred to as "inner side") and the side wall 61f is a wall on the side opposite to the center line CL side in the X axis direction (hereinafter simply referred to as "outer side"). The side wall 61d is a wall on one side in the Y axis direction (hereinafter simply referred to as "one side") and the side wall 61e is a wall on the other side in the Y axis direction (hereinafter simply referred to as "the other side"). The first opening 61a is an opening facing upside and the second opening 61b is an opening facing obliquely downward toward the inner side.

The weighing hopper 6 further has an attaching portion 20 that can be attached and detached with respect to an attached portion 40 (see FIGS. 4 to 6) provided on the combination weighing apparatus 1. The attaching portion 20 includes a pair of supporting plates 21 and 22 and a pair of attaching bars 23 and 24. The pair of supporting plates 21 and 22 are arranged side by side in the Y axis direction in a state of being away from each other. Each of the supporting plates 21 and 22 is fixed onto the outer surface of the side wall 61c and extends downward. The pair of attaching bars 23 and 24 are arranged side by side in the Z axis direction in a state of being away from each other. Each of the attaching bars 23 and 24 is bridged between the pair of supporting plates 21 and 22.

Figure 3A:
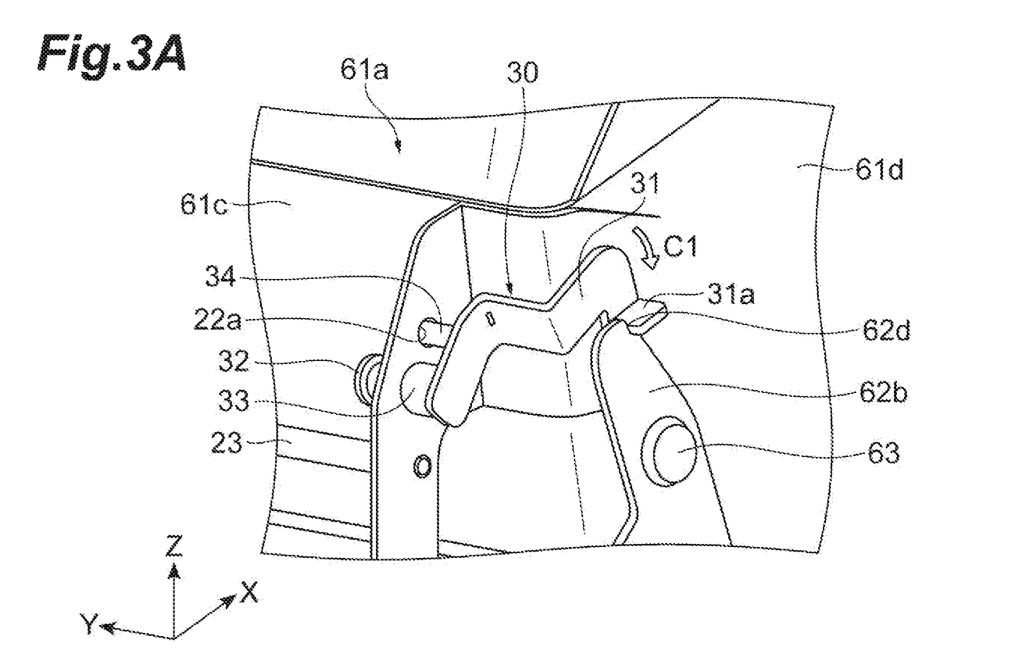
FIGS. 3A and 3B is perspective views of a part of the weighing hopper in FIG. 2.
Figure 3B:
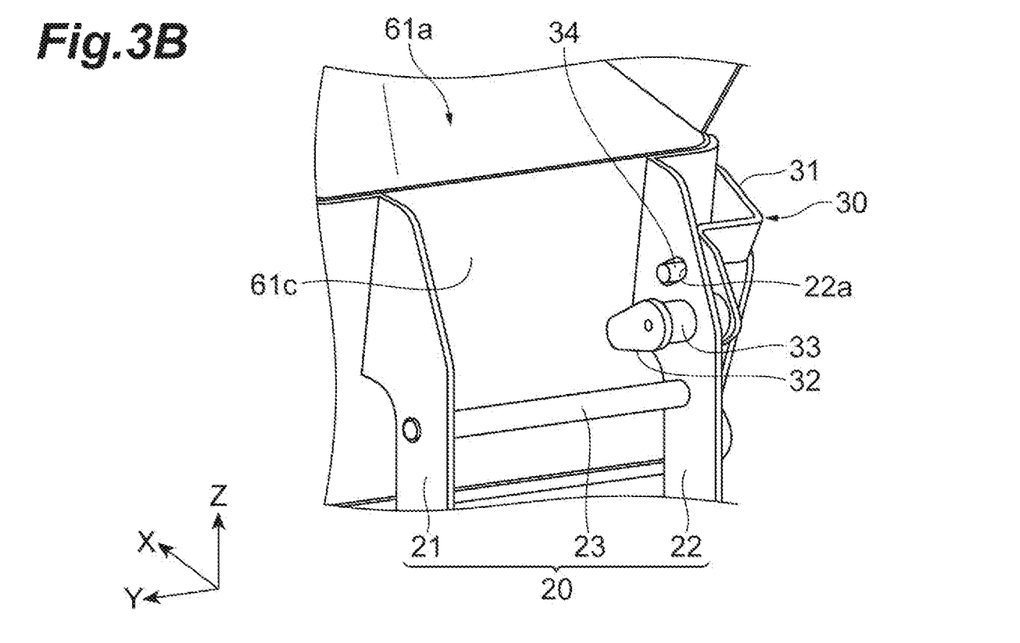

As illustrated in FIG. 2, FIGS. 3A and 3B, the weighing hopper 6 further has a restricting portion 30 that restricts the opening and closing operation of the gate 62 with respect to the second opening 61b. The restricting portion 30 includes an engaging member 31, a contact member 32, a shaft 33, and a stopper 34. The shaft 33 is rotatably attached to the supporting plate 22 in a state of running through the supporting plate 22 of one side on the upper side than the attaching bar 23 of the upper side. The engaging member 31 is fixed to the end portion on one side of the shaft 33 and extends toward one side of the side wall 61d. At the distal end portion of the engaging member 31, a protruding edge portion 31a protruding toward one side is provided. The engaging member 32 is fixed to the end portion on the other side of the shaft 33 and extends obliquely downward toward the outside. The stopper 34 protrudes from the engaging member 31 toward the other side and is arranged in a slit 22a formed in the supporting plate 22.

The engaging member 31 is integrally rotatable with the contact member 32 about the shaft 33 as a rotation axis. However, the rotational range of the engaging member 31 and the contact member 32 is limited in a range in which the stopper 34 can move within the slit 22a. That is, the engaging member 31 is able to turn integrally with the contact member 32 about the shaft 33 as a rotation axis. The engaging member 31 extends obliquely upward toward the outside when viewed from the Y axis direction, and thus, by the own weight of the engaging member 31, the engaging member 31 attempts to turn toward one side C1 (clockwise when viewed from the Y axis direction) about the shaft 33 as a rotation axis.

As in the foregoing, the gate 62 can be opened and closed with respect to the second opening 61b of the main body 61. The gate 62 has a lid portion 62a, an engaged portion 62b, and an arm 62c. The lid portion 62a is rotatable about a shaft 63 provided on each of the side walls 61d and 61e as a rotation axis. The lid portion 62a opens and closes the second opening 61b by swinging with the shaft 63 as a rotation axis. The engaged portion 62b extends upward from a portion of the lid portion 62a of the side wall 61d side where the shaft 63 is attached. At the distal end portion of the engaged portion 62b, a cutout 62d is formed. The cutout 62d is a portion to be engaged with the protruding edge portion 31a of the engaging member 31 turned toward the one side C1 in a state where the lid portion 62a is closed with respect to the second opening 61b. The arm 62c extends obliquely downward toward the inner side from the portion of the lid portion 62a of the side wall 61d side where the shaft 63 is attached. At the distal end portion of the arm 62c, a roller 64 is rotatably attached.

Configuration of Attached Portion

Figure 4:
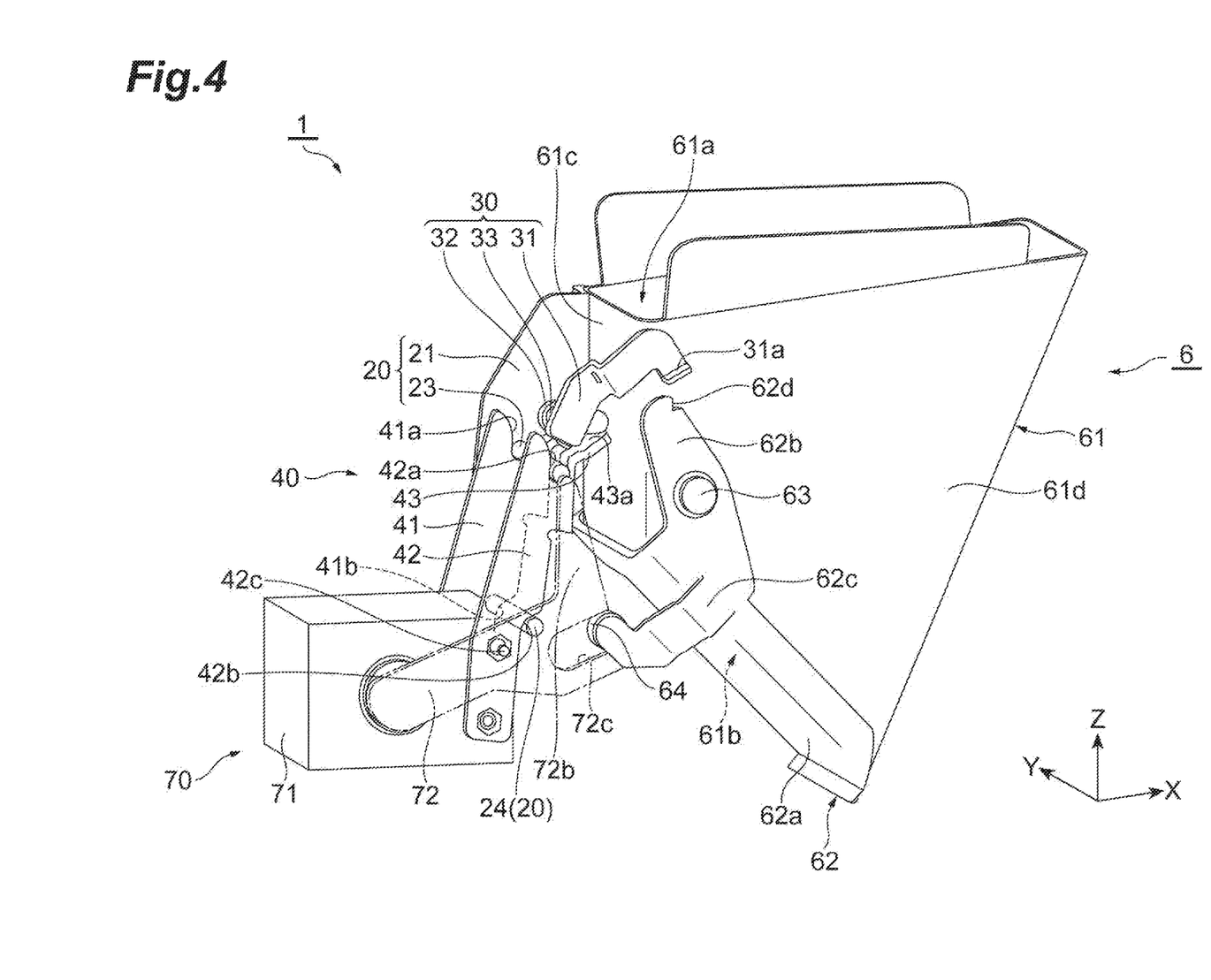
FIG. 4 is a diagram for explaining a procedure of attaching and detaching the weighing hopper with respect to the combination weighing apparatus in FIG. 1.
Figure 5:
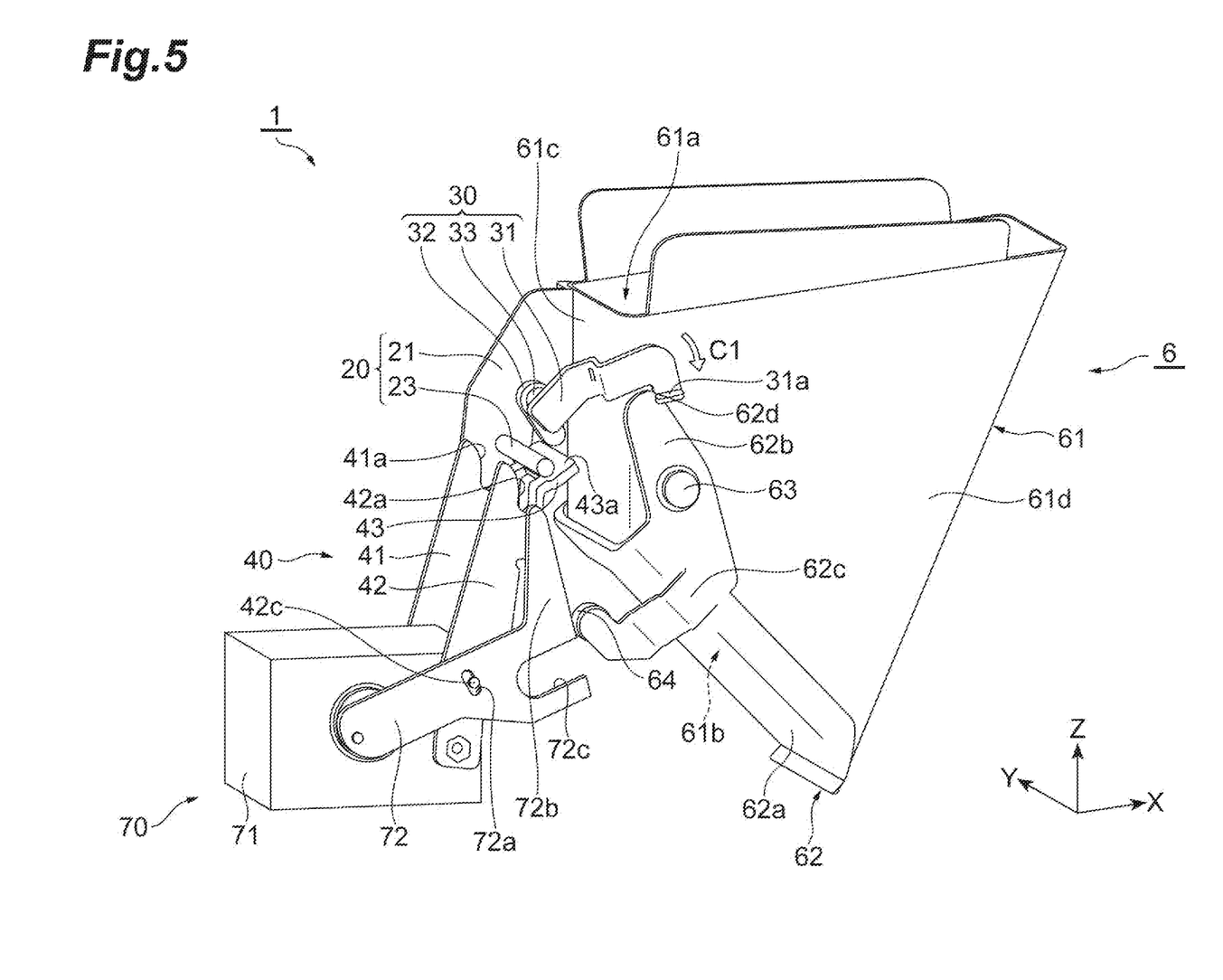
FIG. 5 is a diagram for explaining the procedure of attaching and detaching the weighing hopper with respect to the combination weighing apparatus in FIG. 1.
Figure 6:
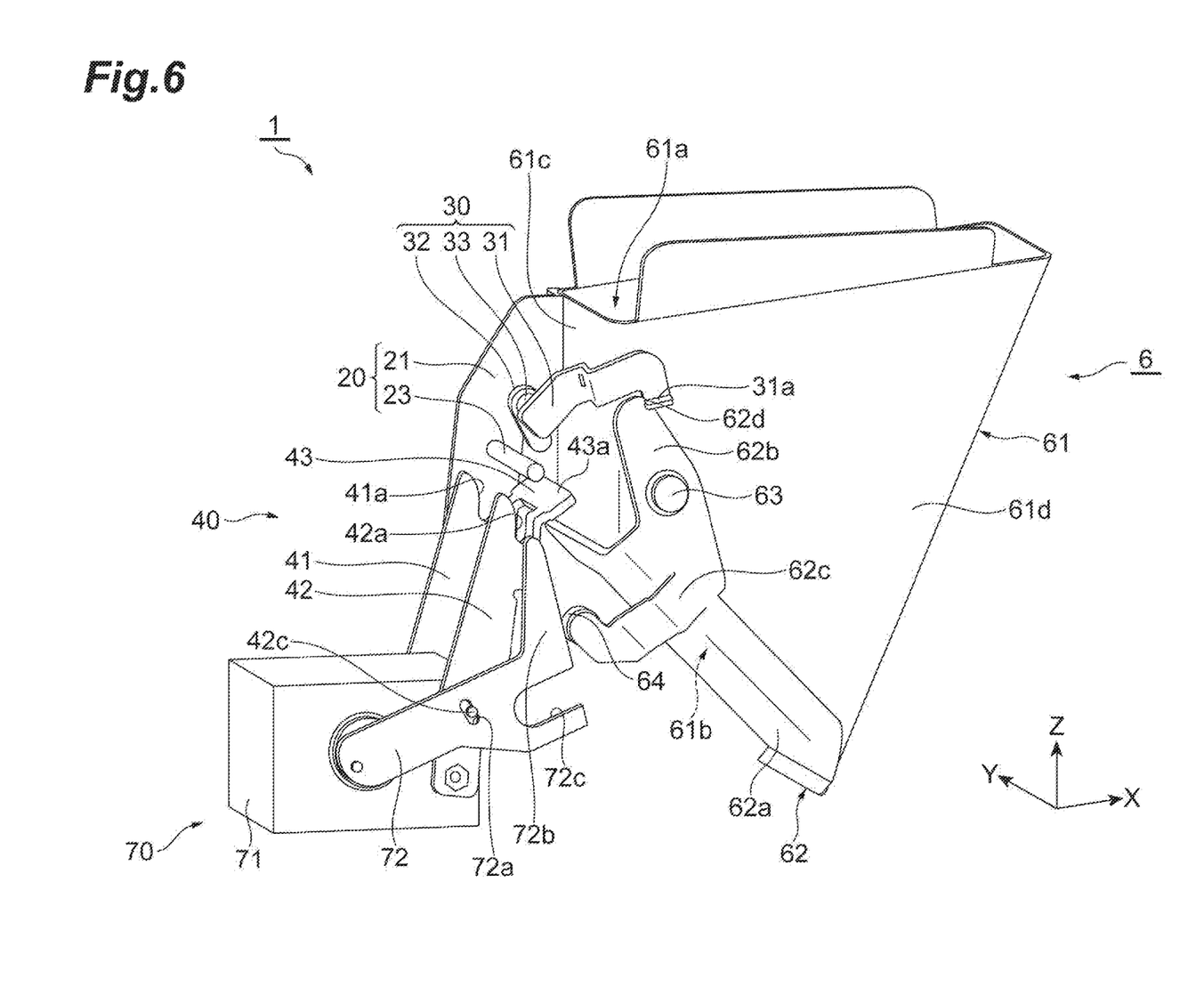
FIG. 6 is a diagram for explaining the procedure of attaching and detaching the weighing hopper with respect to the combination weighing apparatus in FIG. 1.

In the combination weighing apparatus 1, as illustrated in FIG. 4 to FIG. 6, the attached portion 40 with which the attaching portion 20 of the weighing hopper 6 is attached and detached is provided. In FIG. 4 to FIG. 6, the depiction of the supporting plate 22 of the weighing hopper 6 is omitted for ease of explanation. The attached portion 40 is fixed to a drive unit 70. The drive unit 70 is directly or indirectly fixed to the case 13 (see FIG. 1) of the combination weighing apparatus 1. The drive unit 70 includes a drive portion 71 and a swing portion 72. The swing portion 72 is fixed to a drive shaft of the drive portion 71 and extends obliquely upward toward the outside. In the swing portion 72, a slit 72a in which a stopper 42c provided to the attached portion 40 is arranged is formed. The swing portion 72 can swing in a range in which the stopper 42c can move within the slit 72a. At the distal end of the swing portion 72, a guide 72b extending upward is provided and also a cutout 72c opening obliquely upward toward the outside is formed. The guide 72b guides the roller 64 of the weighing hopper 6 to the cutout 72c when the weighing hopper 6 is attached to the combination weighing apparatus 1. In the cutout 72c, the roller 64 of the weighing hopper 6 is disposed when the weighing hopper 6 is attached to the combination weighing apparatus 1 (see FIG. 4).

The attached portion 40 has a pair of attaching plates 41 and 42 and a contacted portion 43. The pair of attaching plates 41 and 42 are arranged side by side in the Y axis direction in a state of being away from each other. On the pair of attaching plates 41 and 42, a pair of receiving surfaces 41a and 42a, respectively, are formed. Each of the receiving surfaces 41a and 42a is a recessed surface facing upward. On the pair of attaching plates 41 and 42, a pair of receiving surfaces 41b and 42b, respectively, are formed. Each of the receiving surfaces 41b and 42b is a recessed surface facing obliquely downward toward the outside and is located on a lower side than the respective receiving surfaces 41a and 42a. On the pair of receiving surfaces 41a and 42a, the attaching bar 23 of the attaching portion 20 in the weighing hopper 6 is disposed when the weighing hopper 6 is attached to the combination weighing apparatus 1. On the pair of receiving surfaces 41b and 42b, the attaching bar 24 of the attaching portion 20 in the weighing hopper 6 is disposed when the weighing hopper 6 is attached to the combination weighing apparatus 1. The contacted portion 43 is bridged to the attaching plates 41 and 42. The contacted portion 43 extends obliquely upward toward the outside so that an upper surface 43a of the contacted portion 43 and each of the receiving surfaces 41a and 42a are continuous.

Restriction of Opening and Closing Operation of Gate

In the weighing hopper 6 thus configured, the opening and closing operation of the gate 62 with respect to the second opening 61b can be restricted (locked) by the restricting portion 30. The following describes, referring to FIG. 4 to FIG. 6, a procedure of attaching and detaching the weighing hopper 6 with respect to the combination weighing apparatus 1.

First, a procedure for which an operator detaches the weighing hopper 6 from the combination weighing apparatus 1 will be described. In the example of FIG. 4, the weighing hopper 6 is attached to the combination weighing apparatus 1. In this state, the contacted portion 43 of the attached portion 40 and the contact member 32 of the restricting portion 30 are in contact; the engaging member 31 is turned toward the side opposite (the other side) to the one side C1 against the own weight, and the engagement between the protruding edge portion 31a of the restricting portion 30 and the cutout 62d of the gate 62 is released. Accordingly, via the roller 64 of the gate 62 disposed on the cutout 72c of the swing portion 72, the gate 62 is opened and closed in accordance with the swing operation of the swing portion 72.

When the operator lifts the weighing hopper 6 from the state illustrated in FIG. 4, the roller 64 is guided by the guide 72b and the gate 62 becomes in a closed state with respect to the second opening 61b. As the operator lifts up the weighing hopper 6, as illustrated in FIG. 5, the attaching portion 20 is moved upward with respect to the attached portion 40, and the contact between the contacted portion 43 of the attached portion 40 and the contact member 32 of the restricting portion 30 is gradually released. As a result, the engaging member 31 turns toward the one side C1 by the own weight, and in a state where the gate 62 is closed with respect to the second opening 61b, the engagement between the protruding edge portion 31a of the engaging member 31 and the cutout 62d of the gate 62 is started. That is, the restricting portion 30 starts restricting the opening and closing operation of the gate 62 in a state where the gate 62 is closed with respect to the second opening 61b in conjunction with the operation of detaching the attaching portion 20 from the attached portion 40.

When the operator further lifts up the weighing hopper 6 from the state illustrated in FIG. 5, the contacted portion 43 of the attached portion 40 and the contact member 32 of the restricting portion 30 are separated from each other as illustrated in FIG. 6. Thereafter, a state where the restricting portion 30 locks the opening and closing operation of the gate 62 is maintained. Thus, even if the operator detached the weighing hopper 6 from the combination weighing apparatus 1 with one hand for example, the gate 62 is automatically locked in a closed state in conjunction with such a detaching operation.

Next, a procedure for which the operator attaches the weighing hopper 6 to the combination weighing apparatus 1 will be described. First, as illustrated in FIG. 6, the operator brings the weighing hopper 6 close to the combination weighing apparatus 1 so that the attaching bar 23 of the attaching portion 20 is located above the receiving surfaces 41a and 42a of the attached portion 40 and also the roller 64 is brought into contact with the guide 72b.

Subsequently, when the operator lowers the position of the weighing hopper 6 from the state illustrated in FIG. 6, the contact between the contact member 32 and the contacted portion 43 of the attached portion 40 is started as illustrated in FIG. 5. As the operator lowers the position of the weighing hopper 6, the attaching bar 23 of the attaching portion 20 is guided by the upper surface 43a of the contacted portion 43 so as to head for the respective receiving surfaces 41a and 42a. At this time, the roller 64 of the gate 62 is guided by the guide 72b of the drive unit 70 so as to head for the cutout 72c.

Furthermore, when the operator lowers the weighing hopper 6 from the state illustrated in FIG. 5, the contacted portion 43 of the attached portion 40 pushes the contact member 32 of the restricting portion 30 obliquely upward toward the outside and the engaging member 31 is turned toward the side opposite to the one side C1 against the own weight as illustrated in FIG. 4. As a result, the engagement between the protruding edge portion 31a of the engaging member 31 and the cutout 62d of the gate 62 is released. That is, the restricting portion 30 releases the restriction of the opening and closing operation of the gate 62 as the contact between the contacted portion 43 of the attached portion 40 and the contact member 32 of the restricting portion 30 is started when the attaching portion 20 is attached to the attached portion 40. Thus, even if the operator attached the weighing hopper 6 to the combination weighing apparatus 1 with one hand for example, the lock of the gate 62 is automatically released in conjunction with such an attaching operation. At this time, the attaching bar 23 of the attaching portion 20 is received in the respective receiving surfaces 41a and 42a and also the attaching bar 24 of the attaching portion 20 is disposed on the respective receiving surfaces 41b and 42b. The roller 64 of the gate 62 is disposed on the cutout 72c of the drive unit 70 and the gate 62 can be opened and closed in accordance with the swing operation of the swing portion 72.

Working and Effect

With the combination weighing apparatus 1 and the weighing hopper 6, the restricting portion 30 starts locking (restricting) the opening and closing operation in a state where the gate 62 is closed with respect to the second opening 61b in conjunction with the operation of detaching the attaching portion 20 from the attached portion 40. Thus, even if the operator detached the weighing hopper 6 from the combination weighing apparatus 1 with one hand for example, the gate 62 is automatically locked in a closed state in conjunction with such a detaching operation. Furthermore, with the combination weighing apparatus 1 and the weighing hopper 6, the restricting portion 30 releases the lock of the opening and closing operation in conjunction with the operation of attaching the attaching portion 20 to the attached portion 40. As a result, the gate 62 can be opened and closed with respect to the second opening 61b. Thus, even if the hopper is attached to the combination weighing apparatus 1 with one hand for example, the lock of the gate 62 is automatically released in conjunction with such an attaching operation and the gate 62 is in a state of being able to be opened and closed. As a result, it is possible to improve the ease of attaching and detaching the weighing hopper 6.

In the weighing hopper 6, the restricting portion 30 starts locking the opening and closing operation of the gate 62 in a state where the gate 62 is closed with respect to the second opening 61b, as the contact between the restricting portion 30 and the attached portion 40 is released when the attaching portion 20 is detached from the attached portion 40. As a result, the restricting portion 30 can start locking the opening and closing operation of the gate 62 by utilizing the physical contact between the restricting portion 30 and the attached portion 40.

In the weighing hopper 6, the restricting portion 30 releases the restriction of the opening and closing operation of the gate 62, as the contact between the restricting portion 30 and the attached portion 40 is started when the attaching portion 20 is attached to the attached portion 40. As a result, the restricting portion 30 can release the lock of the opening and closing operation of the gate 62 by utilizing the physical contact between the restricting portion 30 and the attached portion 40.

In the weighing hopper 6, the restricting portion 30 has the engaging member 31 that can engage with the engaged portion 62b of the gate 62 by turning, and the contact member 32 that can be integrally turned with the engaging member 31. The engagement between the protruding edge portion 31a of the engaging member 31 and the cutout 62d of the gate 62 is started in a state where the gate 62 is closed with respect to the second opening 61b, as the contact between the contact member 32 of the restricting portion 30 and the contacted portion 43 of the attached portion 40 is released when the attaching portion 20 is detached from the attached portion 40. The engagement between the protruding edge portion 31a of the engaging member 31 and the cutout 62d of the gate 62 is released, as the contact between the contact member 32 of the restricting portion 30 and the contacted portion 43 of the attached portion 40 is started when the attaching portion 20 is attached to the attached portion 40. As just described, because the contact member 32 can be turned integrally with the engaging member 31, the engaging member 31 is turned with the contact member 32 as the contacted portion 43 of the attached portion 40 comes into contact with the contact member 32 of the restricting portion 30. Thus, the engaging member 31 can enable the gate 62 to be opened and closed with respect to the second opening 61b.

In the weighing hopper 6, the engaging member 31 turns toward the one side C1 by the own weight and the engagement between the protruding edge portion 31a of the engaging member 31 and the cutout 62d of the gate 62 is started in a state where the gate 62 is closed with respect to the second opening 61b, as the contact between the contact member 32 of the restricting portion 30 and the contacted portion 43 of the attached portion 40 is released when the attaching portion 20 is detached from the attached portion 40. The engaging member 31 is turned toward the side opposite (the other side) to the one side C1 against the own weight and the engagement between the protruding edge portion 31a of the engaging member 31 and the cutout 62d of the gate 62 is released, as the contact between the contact member 32 of the restricting portion 30 and the contacted portion 43 of the attached portion 40 is started when the attaching portion 20 is attached to the attached portion 40. As just described, by utilizing the own weight of the engaging member 31, the engagement between the protruding edge portion 31a of the engaging member 31 and the cutout 62d of the gate 62 can be started without utilizing a biasing member such as a spring, for example.

Modifications

As in the foregoing, one embodiment of the present disclosure has been described. The present invention, however, is not limited to the above-described embodiment. For example, in the above-described embodiment, the restricting portion 30 having the engaging member 31 including the protruding edge portion 31a, the contact member 32, the shaft 33, and the stopper 34 and the gate 62 having the cutout 62d have been illustrated. However, the configurations of the restricting portion 30 and the gate 62 are not limited thereto. As long as the restricting portion 30 is capable of restricting the opening and closing operation of the gate 62, the configurations of the restricting portion 30 and the gate 62 can be changed as appropriate.

In the above-described embodiment, the contacted portion 43 of the attached portion 40 that comes into contact with the contact member 32 of the restricting portion 30 has been integrally bridged to the attaching plates 41 and 42 so as to connect the receiving surfaces 41a and 42a. However, as long as the contacted portion 43 can contact the contact member 32, the contacted portion 43 may be provided at another portion of the attached portion 40 or may be formed separately from the attaching plates 41 and 42.

In the above-described embodiment, by utilizing the own weight of the engaging member 31, the engagement between the protruding edge portion 31a of the engaging member 31 and the cutout 62d of the gate 62 has been started. However, the relevant engagement may be started by utilizing a biasing member such as a spring, for example.

In the above-described embodiment, although the combination weighing apparatus 1 has been exemplified as a weighing apparatus, it only needs to be a weighing apparatus provided with an attached portion on which the weighing hopper 6 is attached.

REFERENCE SIGNS LIST

1 Combination Weighing Apparatus (Weighing Apparatus)
2 Input Chute (Conveying Unit)
3 Distributing Feeder (Conveying Unit)
4 Radial Feeder (Conveying Unit)
6 Weighing Hopper (Hopper)
11 Weighing Unit
14 Controller
30 Restricting Portion
31 Engaging Member
32 Contact Member
61 Main Body
61a First Opening
61b Second Opening
62 Gate
A Articles
C1 One Side

The invention claimed is:

1. A hopper to be attached to a weighing apparatus comprising:
   a main body having a first opening to which articles are thrown in and a second opening from which the articles are discharged;
   a gate capable of being opened and closed with respect to the second opening;
   a restricting portion configured to restrict an opening and closing operation of the gate with respect to the second opening; and
   an attaching portion capable of being attached and detached with respect to an attached portion provided on the weighing apparatus, wherein
   the restricting portion starts restricting the opening and closing operation in a state where the gate is closed with respect to the second opening in conjunction with an operation of detaching the attaching portion from the attached portion.

2. A hopper to be attached to a weighing apparatus comprising:
   a main body having a first opening to which articles are thrown in and a second opening from which the articles are discharged;
   a gate capable of being opened and closed with respect to the second opening;
   a restricting portion configured to restrict an opening and closing operation of the gate with respect to the second opening; and
   an attaching portion capable of being attached and detached with respect to an attached portion provided on the weighing apparatus, wherein
   the restricting portion releases restriction of the opening and closing operation in conjunction with an operation of attaching the attaching portion to the attached portion.

3. The hopper according to claim 1, wherein the restricting portion starts restricting the opening and closing operation in a state where the gate is closed with respect to the second opening, as a contact between the restricting portion and the attached portion is released when the attaching portion is detached from the attached portion.

4. The hopper according to claim 2, wherein the restricting portion releases the restriction of the opening and closing operation, as a contact between the restricting portion and the attached portion is started when the attaching portion is attached to the attached portion.

5. The hopper according to claim 3, wherein
the restricting portion has an engaging member capable of engaging with the gate by turning, and a contact member capable of integrally turning with the engaging member,
when the attaching portion is detached from the attached portion, a contact between the contact member and the attached portion is released and a engagement between the engaging member and the gate is started in a state where the gate is closed with respect to the second opening, and
when the attaching portion is attached to the attached portion, the contact between the contact member and the attached portion is started, and the engagement between the engaging member and the gate is released.

6. The hopper according to claim 5, wherein
the engaging member turns toward one side by own weight of the engaging member and the engagement between the engaging member and the gate is started in a state where the gate is closed with respect to the second opening, as the contact between the contact member and the attached portion is released when the attaching portion is detached from the attached portion, and
the engaging member is turned toward the other side against the own weight and the engagement between the engaging member and the gate is released, as the contact between the contact member and the attached portion is started when the attaching portion is attached to the attached portion.

7. A combination weighing apparatus comprising:
a conveying unit configured to convey articles;
a plurality of hoppers configured to temporarily store the articles conveyed by the conveying unit;
a weighing unit configured to weigh a measured value corresponding to a mass of the articles stored in the hopper;
a controller configured to select a combination of the measured values from a plurality of the measured values that are weighed by the weighing unit and associated with the respective hoppers such that a total value results in a target measured value and to cause the hoppers that are associated with the relevant combination to discharge the articles; and
attached portions to which the hoppers are attached respectively, wherein
each of the hoppers includes:
a main body having a first opening to which the articles are thrown in and a second opening from which the articles are discharged;
a gate capable of being opened and closed with respect to the second opening;
a restricting portion configured to restrict an opening and closing operation of the gate with respect to the second opening; and
an attaching portion capable of being attached and detached with respect to an attached portion, and
the restricting portion starts restricting the opening and closing operation in a state where the gate is closed with respect to the second opening in conjunction with an operation of detaching the attaching portion from the attached portion.

8. A combination weighing apparatus comprising:
a conveying unit configured to convey articles;
a plurality of hoppers configured to temporarily store the articles conveyed by the conveying unit;
a weighing unit configured to weigh a measured value corresponding to a mass of the articles stored in the hopper;
a controller configured to select a combination of the measured values from a plurality of the measured values that are weighed by the weighing unit and associated with the respective hoppers such that a total value results in a target measured value and to cause the hoppers that are associated with the relevant combination to discharge the articles; and
attached portions to which the hoppers are attached respectively, wherein
each of the hoppers includes:
a main body having a first opening to which the articles are thrown in and a second opening from which the articles are discharged;
a gate capable of being opened and closed with respect to the second opening;
a restricting portion configured to restrict an opening and closing operation of the gate with respect to the second opening; and
an attaching portion capable of being attached and detached with respect to an attached portion, and
the restricting portion releases restriction of the opening and closing operation in conjunction with an operation of attaching the attaching portion to the attached portion.

9. The hopper according to claim 4, wherein
the restricting portion has an engaging member capable of engaging with the gate by turning, and a contact member capable of integrally turning with the engaging member,
when the attaching portion is detached from the attached portion, a contact between the contact member and the attached portion is released and a engagement between the engaging member and the gate is started in a state where the gate is closed with respect to the second opening, and
when the attaching portion is attached to the attached portion, the contact between the contact member and the attached portion is started, and the engagement between the engaging member and the gate is released.

10. The hopper according to claim 9, wherein
the engaging member turns toward one side by own weight of the engaging member and the engagement between the engaging member and the gate is started in a state where the gate is closed with respect to the second opening, as the contact between the contact member and the attached portion is released when the attaching portion is detached from the attached portion, and
the engaging member is turned toward the other side against the own weight and the engagement between the engaging member and the gate is released, as the contact between the contact member and the attached portion is started when the attaching portion is attached to the attached portion.

\* \* \* \* \*